United States Patent [19]
Williams

[11] Patent Number: 4,589,599
[45] Date of Patent: May 20, 1986

[54] ICE CHOPPER APPARATUS FOR PRODUCING ICE PARTICLES OF CONTROLLED SIZE

[75] Inventor: James E. Williams, Stamford, Conn.
[73] Assignee: Cuisinarts, Inc., Greenwich, Conn.
[21] Appl. No.: 543,766
[22] Filed: Oct. 20, 1983
[51] Int. Cl.[4] .............................................. B02C 19/12
[52] U.S. Cl. ................................ 241/37.5; 241/282.2; 241/DIG. 17
[58] Field of Search ................. 241/DIG. 17, 92, 37.5, 241/36, 278 R, 296, 282.1, 275, 282.2, 199.12

[56] References Cited
U.S. PATENT DOCUMENTS

| | | | |
|---|---|---|---|
| 2,905,397 | 9/1959 | De Angelis et al. | 241/DIG. 17 X |
| 3,515,357 | 6/1970 | Clark | 241/DIG. 17 X |
| 3,519,047 | 7/1970 | Peterson et al. | 241/278 |
| 3,985,304 | 10/1976 | Sontheimer | 241/92 |
| 4,283,979 | 8/1981 | Rakocy et al. | 241/92 X |

*Primary Examiner*—Mark Rosenbaum
*Attorney, Agent, or Firm*—Parmelee, Bollinger & Bramblett

[57] ABSTRACT

An ice chopping apparatus is provided for a food processor having a base containing a motor and a motor-driven rotary tool drive which extends into a working bowl. The apparatus involves mounting a rotary ice chopping tool on the tool drive in the working bowl and establishing an annular channel around the chopping tool, forming an escape gap of predetermined size around the perimeter of the annular channel and feeding ice chunks into the channel. These chunks when reduced to the proper size are discharged through the escape gap and become deposited in the bowl. The gap may be adjusted for varying the size of the discharged ice fragments. The apparatus includes a removable disc-like head having a socket on the underside and preferably two radially spaced blades protruding upwardly from the disc-like member, with their front edges chopping the ice. The socket receives a removable shank of the same geometrical shape coupled on the other end to the rotary drive. The shank has a key which fits into spaced key-shaped channels in the socket, extending to different depths therein for varying the size of the escape gap between the annular channel and the rotary tool, thereby varying the size of the ice fragments produced. The annular channel has a cylindrical skirt extending downwardly from an upstanding peripheral rim which fits onto the bowl for receiving a cover which includes auxiliary actuator cams to actuate the motor drive.

5 Claims, 10 Drawing Figures

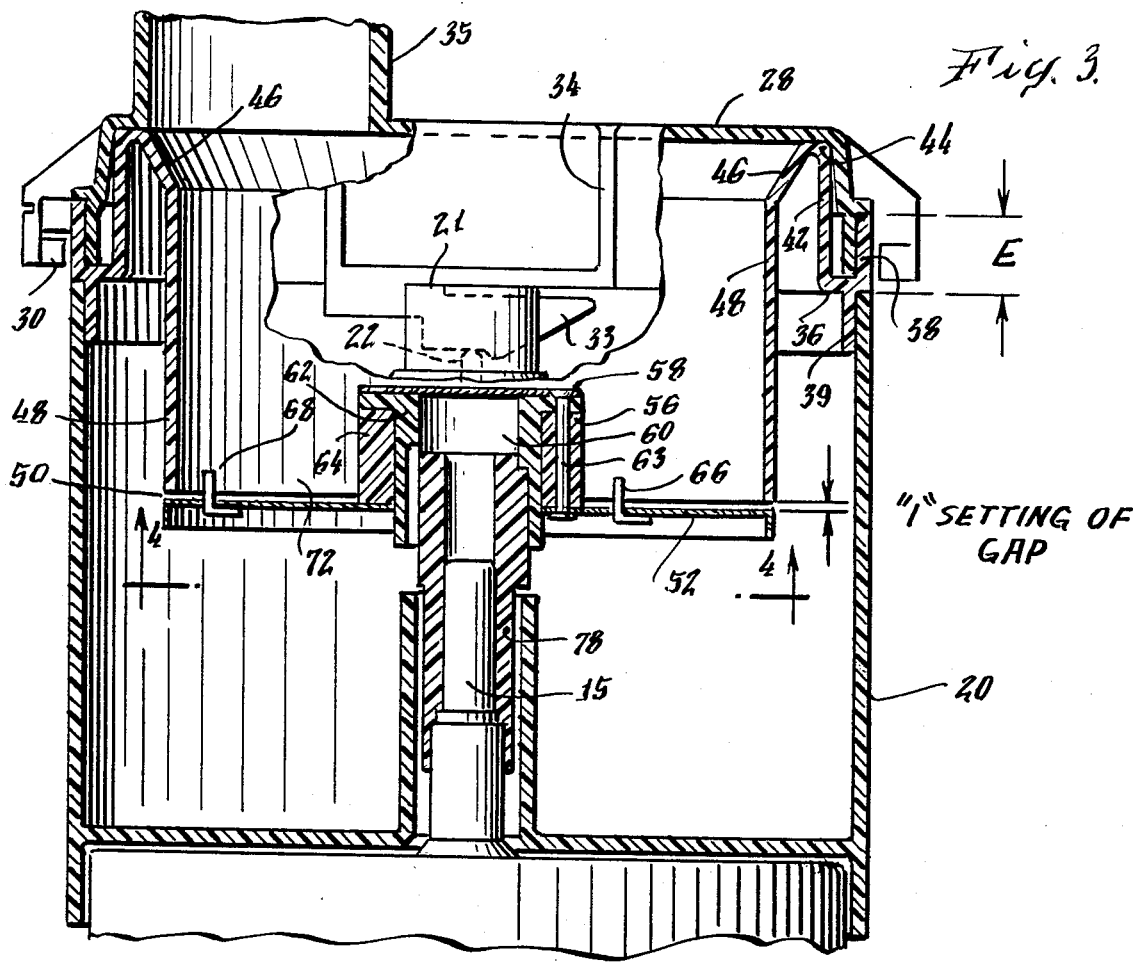
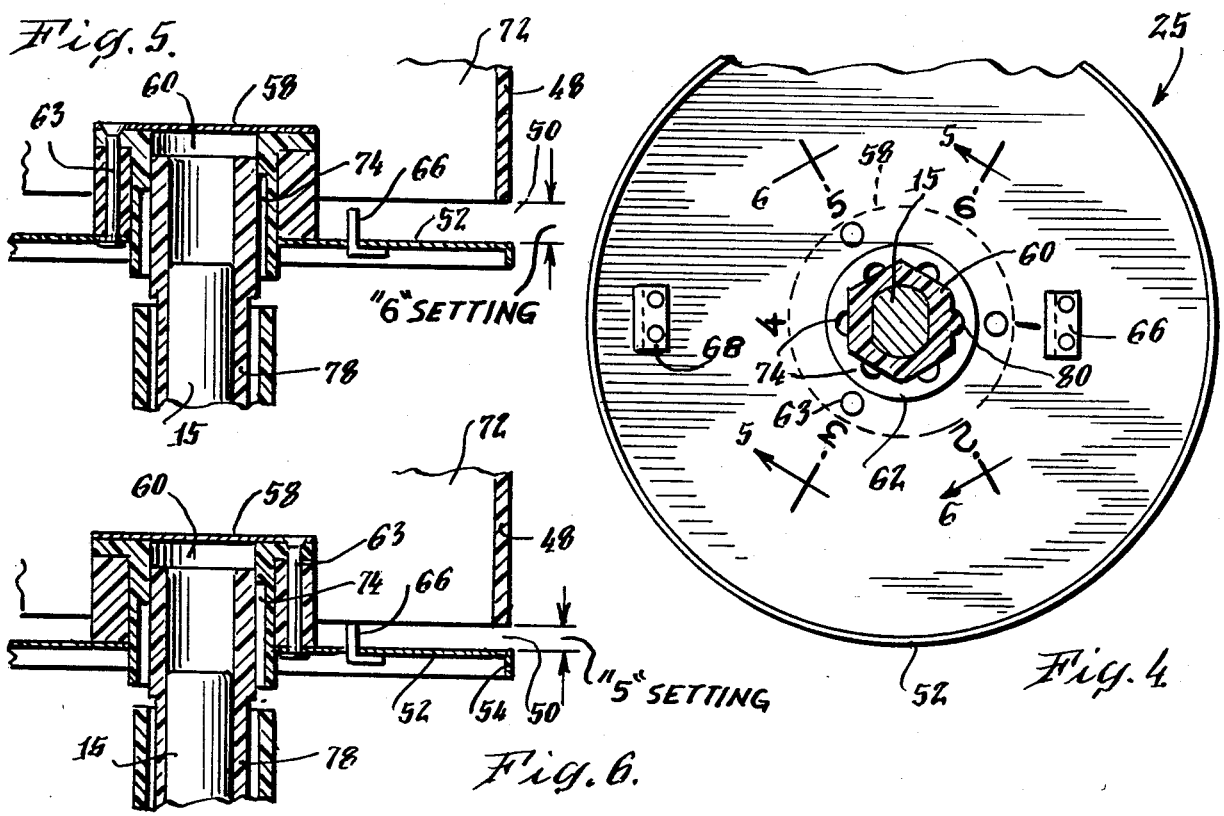

ICE CHOPPER APPARATUS FOR PRODUCING ICE PARTICLES OF CONTROLLED SIZE

BACKGROUND OF THE INVENTION

This invention relates to ice chopping apparatus for a kitchen appliance or as an attachment to a food processor or similar appliance for processing ice chunks, cubes or similar ice pieces into ice fragments of controlled size. A plethora of kitchen appliances have become available which perform a variety of functions in the processing and preparation of food items as well as juicers, blenders etc. The more versatile these appliances become, namely in the performance of multiple functions, eliminates the requirement to have a multiplicity of such appliances cluttering or taking up useful counter space in the kitchen. Food processors are an example of these versatile multi-function devices which may be utilized for performing a variety of cutting, rasping, chopping, kneading, mixing, grinding, etc. functions. However, most of the attachments or tools used in the food processors do not perform a good job of fragmentating ice chunks with a predetermined size or configuration of suitable size as well as having an appetizing appearance.

SUMMARY OF THE INVENTION

Accordingly, it is an object of this invention to provide a new and improved apparatus for processing ice chunks to produce ice fragments of controlled size in a kitchen type appliance.

A further object of this invention is to provide a new and improved ice chopping apparatus which can utilize and be mounted on the base of a food processor and which employs the motor and motor drive of the food processor.

A further object of this invention is to provide a new and improved ice chopping apparatus which is compact, efficient, attractive and produces ice fragments of controllable size.

Another object of this invention is to provide an ice chopping apparatus which may be attached to a food processor and which enjoys all the safety interlock features which are presently utilized in food processors to prevent damage or injury to the machine or user.

Among the further advantages of this invention is an ice chopping apparatus which may be easily and safely attached to and disengaged from the motor driven tool drive means of a food processor, and is convenient and easy to mount in operating position and to use.

In carrying out this invention in one illustrative embodiment thereof, apparatus for producing ice fragments of controlled size in an electrical kitchen appliance of the type having a motor drive and a working bowl with the motor drive extending into the working bowl involves the steps of mounting a rotary ice chopping tool on the motor drive in the working bowl, establishing an annular channel in the bowl leading to and around the rotary ice chopping tool and forming an escape gap of predetermined size around the perimeter of the annular channel. Ice chunks are fed into the channel of the bowl for reducing the ice chunks to ice fragments which when reduced to the proper size are discharged through the escape gap and deposited in the bowl. The size of the escape gap may be adjusted for controlling the size of the ice fragments which are discharged from the channel into the bowl thereby controllably varying the size of the ice fragments which are processed by the kitchen appliance.

The ice chopping apparatus includes a rotary ice chopper tool having a disc-like head with a geometrically shaped socket on the underside thereof and at least one projecting blade from the flat disc-like surface of the upper side and preferably two radially spaced chopper blades, the outer of which may be angled with respect to the periphery for deflecting the ice fragments into the escape gap. The socket is adapted to be connected by a removable shank to the rotary drive means of the appliance. The shank includes the same geometrical shaped head as the socket with a key on one surface thereof which is adapted to fit into key shaped channels of varying length in the socket for controlling the distance that the shank is moved into the socket. Accordingly the height of the ice chopper with respect to the annular channel, which is formed by an annular channel member resting between a cover and the bowl and having a cylindrical skirt extending downward therefrom, the bottom perimeter of which forms a gap between the rotary ice chopper, is controlled by the amount that the shank penetrates the socket. Since the annular channel member elevates the cover at a higher position than it would normally be on a regular food processor without the channel mounted therein, additional longer locking cams have been added to an existing cover. Accordingly, the safety interlock system included in certain types of food processors is preserved by the ice chopping apparatus of the present invention.

BRIEF DESCRIPTION OF THE DRAWINGS

The invention, together with further objects, features, advantages and aspects thereof will be more fully understood from a consideration of the following description taken in conjunction with the accompanying drawings in which like elements are designated with the same reference numerals throughout the various views.

FIG. 3 is a cross-sectional view taken along line 3—3 of FIG. 1 illustrating a "1" escape gap setting for determining the size of ice fragments which are discharged into the bowl of the food processor.

FIG. 4 is a cross-sectional view taken along line 4—4 of FIG. 3.

FIG. 5 is a partial cross-sectional view of the ice chopping apparatus shown in FIG. 3 illustrating a "6" setting of the escape gap.

FIG. 6 is similar to FIG. 5 showing a "5" setting of the escape gap of the apparatus.

DESCRIPTION OF THE PREFERRED EMBODIMENT

The illustrative embodiment of the present invention is described in connection with its use in food processors of the type having a working bowl with motor driven tool drive means extending into the bowl with which various selected rotary food processing tools can be engaged to be driven for performing various food processing operations in accordance with the desires of the user. A removable cover is secured over the top of the bowl during use. The cover includes a feed tube having a passageway which opens downwardly through the cover into the bowl, and food items to be processed are placed in the feed tube and then pushed down into the bowl if required by means of a removable food pusher which is adapted to slide down in the manner of a plunger in the feed tube. The food items are sliced, grated or otherwise processed by the rotary tool in the bowl. The bowl carries on its periphery a push rod which forms a part of a safety interlock system for actuating the motor drive for driving the tool drive means only when the bowl and the cover are properly positioned on the food processor. The present invention which is described hereinafter is an ice chopping apparatus adapted to be used as an accessory or an attachment to the type of food processor just described. However, it will be understood that the ice processing apparatus of this invention is applicable as a separate kitchen appliance solely for processing ice or in combinations with other mixing, blending or food processing operations or may be applicable for use with other types of kitchen appliances which have a motor and a motor driven tool drive means to which the applicant's invention may be applied.

As used in this application, the ice chopping method apparatus enables the processing of ice or frozen food items which are desired to be processed and reduced in size while in their frozen state. Accordingly, the term ice chunks may at times be used to define a larger piece of ice which is to be reduced into smaller pieces or fragments of predetermined size. The ice chunks may consist of ice in the form of cubes, pieces, cones, cylinders, any of which may be solid or hollow or in any shape in which such ice is formed by ice trays, ice forming apparatus or ice machines. Thus, the purpose of the apparatus of the present invention is to reduce ice of one size into a smaller size regardless of its shape or configuration or the terminology used.

Figure 2:
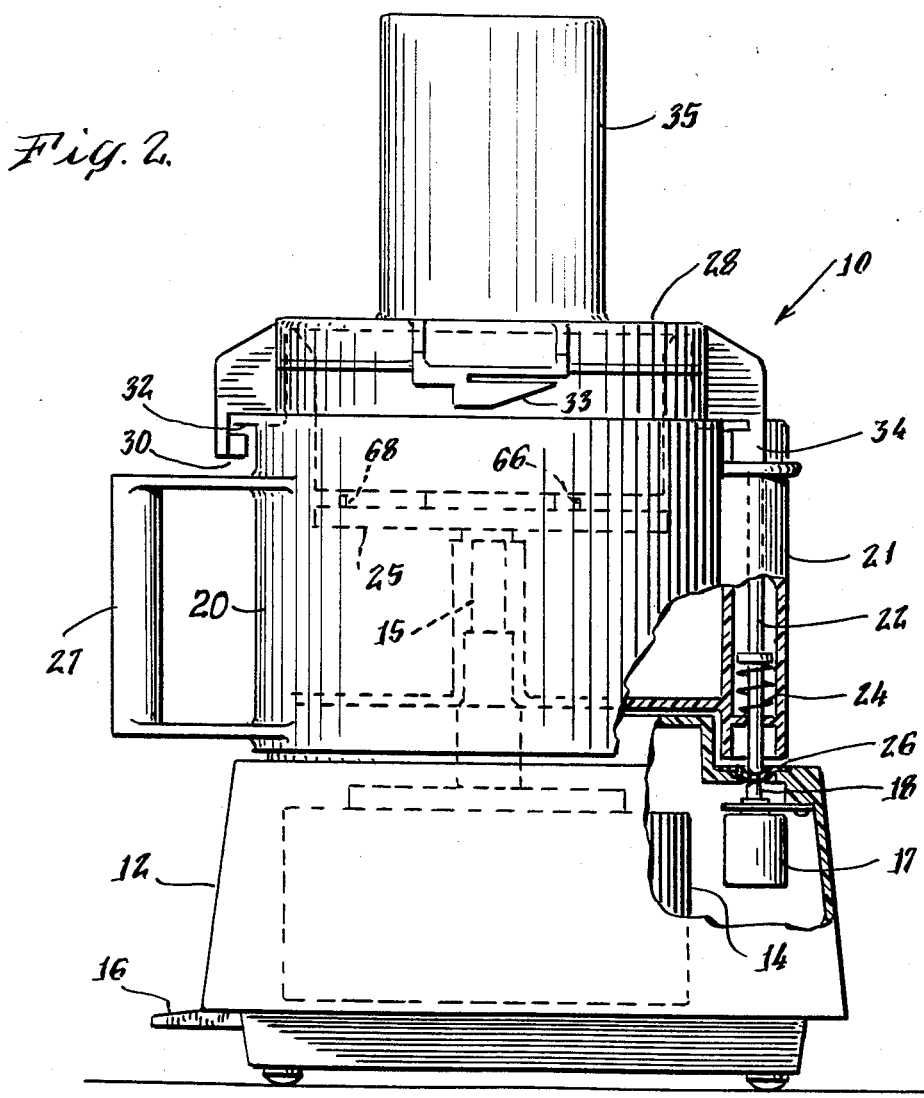
FIG. 2 is a side elevational view, partly in section, of the apparatus illustrated in FIG. 1.

Referring now to FIG. 2, the ice chopping apparatus in this invention is illustrated in use in connection with a food processor which is indicated generally with the reference numeral 10. The food processor 10 includes a base housing 12 having a relatively powerful electric motor 14 mounted therein which is energized by power cord 16 via a switch 17 having a vertically movable actuating button 18. A vertical drive shaft 15 extends upward from the base housing 10 and a working bowl 20 is mountable on the housing 12 surrounding the drive shaft 15. An ice chopper tool 25 which will be described more in detail hereinafter is mounted on the drive shaft 15 for rotation therein within the bowl 20. It will be understood that in conventional food processors a variety of different types of food processing tools may be selectively mounted on the drive shaft 15 to be driven by the motor 14 within the bowl 20.

A vertical semi-cylindrical boss 21 formed an the side of the bowl 20 defines a guideway in which is carried a vertical movable operating rod 22 which is normally urged upwardly by means of a spring 24. When the bowl 20 is properly positioned on housing 12, the operating rod 22 is aligned with the actuating button 18 of the switch 17 being separated therefrom by means of a flexible liquid-tight membrane 26. A handle 27 is attached to the bowl 20 opposite to the boss 21. The top of the bowl 20 is closed by a cover 28 which is arranged to be engaged in lock relationship in a normal operating position on the bowl 20 whenever the food processor 10 is in operation. The cover 28 may be held in lock engagement with the bowl by placing the cover on the rim of the bowl and turning the cover to obtain a twist lock effect. A conventional way of obtaining this locking engagement is illustrated with the cover having a plurality of circumferentially located depending lugs 30 which upon rotation of the cover 20 engage underneath a plurality of cooperating radial edges 32 on the bowl 20 near its rim. At the same time a cam 34 extending downwardly on the cover 20 depresses the actuator rod 22 which closes the switch 17 to enable the operation of the motor 14 for driving the tool shaft 15. The cover also includes a feed tube 35 which in the present application feeds ice chunks or frozen food pieces which are to be chopped and reduced in size through the cover to be applied to the ice chopper tool 25.

Figure 8:
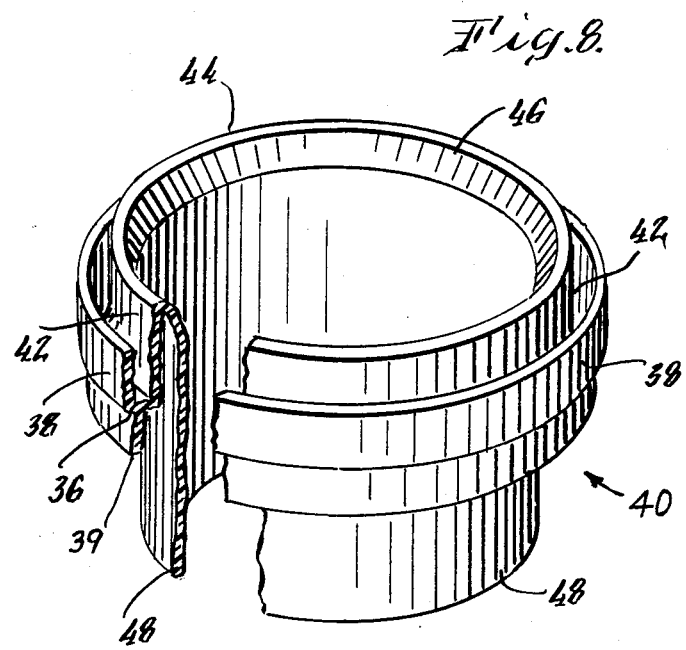
FIG. 8 is a perspective view, partly broken away, illustrating the annular channel member having a downwardly extending cylindrical skirt or wall which directs ice chunks inserted therein to the ice chopping tool.

In order to control the application of the ice which is to be chopped by the food processor 10 as well as to aid in the regulation of the size of the ice fragments which are produced, a removable annular channel member 40 as is best seen in perspective view of FIG. 8 and in sectional view in FIG. 3 is provided with an annular shelf 36 having an upstanding rim 38 extending therefrom as well as a down turned annular skirt 39. The annular channel member 40 is adapted to be positioned on the working bowl with the shelf 36 lying on the upper periphery of the bowl with the upturned rim 38 providing a continuation of the cylindrical side wall of the bowl 20 and the down turned annular skirt 39 resting in the upper interior annular side wall of the bowl 20. The annular channel member 40 includes an upstanding annular wall 42 which forms on its top an annular seat 44 for the cover 28. A slope guide 46 extends downward from the annular seat 44 and terminates in a downward extending cylindrical skirt or wall portion 48 which extends to an area above the periphery of the ice chopper tool 25 forming an escape gap 50 therebetween which in effect determines the size of ice particles which are permitted to escape or be discharged into the bowl 20 as will be described in greater detail hereinafter.

Figure 1:
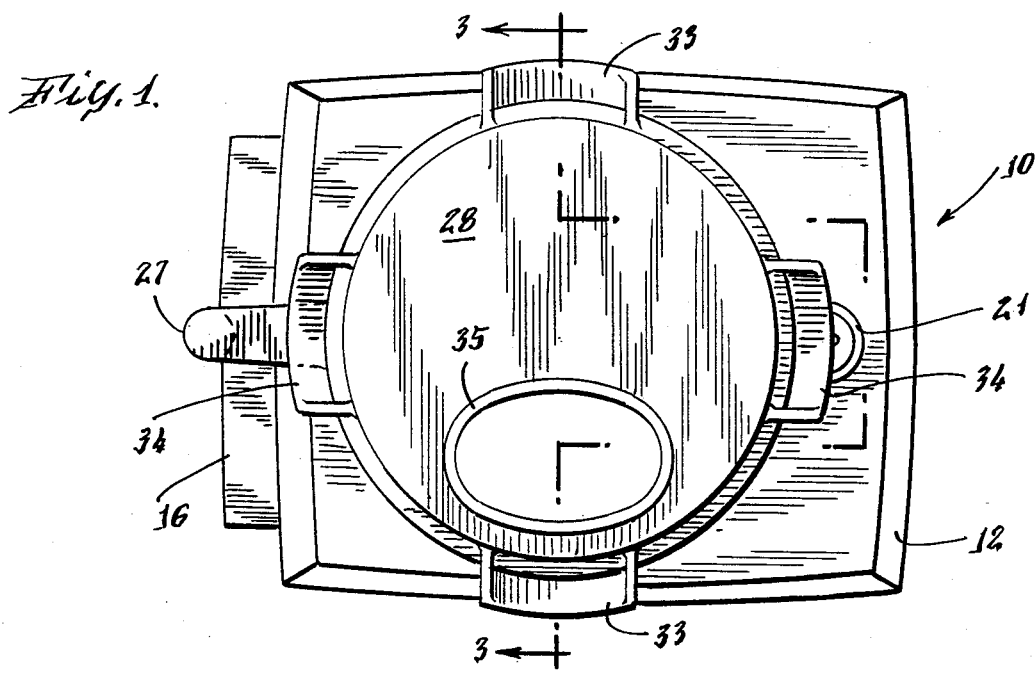
FIG. 1 is a top view of a food processor utilizing the ice chopping apparatus in accordance with the present invention.

It will be noted that the insertable annular channel member 40 which is mounted on top of the working bow 20 between the bowl and the cover 28 thus elevates the cover roughly by the distance or length of the upstanding annular wall 42. In view of this fact the cover 28 must be equipped with a cam 34 which extends to a lower level on the bowl 20 so that it may engage the push rod 22 when the annular channel member 40 is inserted on the bowl 20. Accordingly, as will be seen in FIGS. 1 and 2 the cover 28 is equipped with conventional cams 33 which are adapted to actuate the push rod 22 when the ice chopping apparatus of the present invention is not in use, and it is desired to actuate the food processor by locking the cover on top of the bowl for other food processing operations. In addition the cover 28 is equipped with the lower extending cams 34 so that the ice chopping apparatus of the present invention can be used on the bowl 20 and the mounting of the diametrically opposed camming arrangement is so that the cover with its feed tube 350 may be positioned on different sides of the bowl 20. It will be appreciated that only one of the conventional cams 33 may be formed on the cover along with one of the longer cams 34 if so desired.

Figure 9:
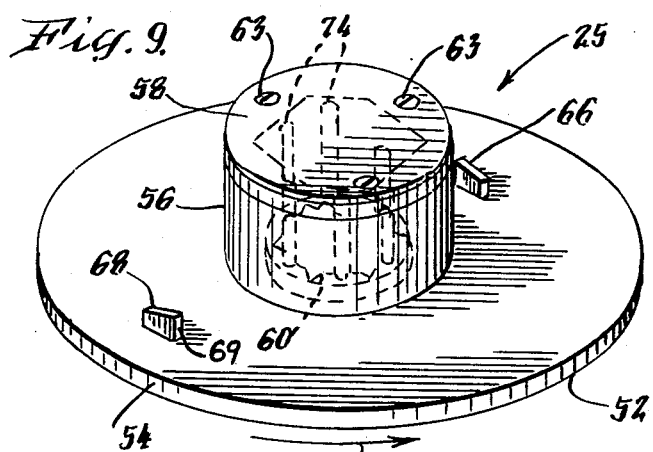
FIG. 9 is a perspective view of the ice chopper tool showing the socket in phantom.

As will best be seen in FIGS. 3 and 9, the ice chopper tool 25 has a disc 52 with a flat, smooth disc-like upper surface 53 having an annular skirt 54 thereon. The disc 52 carries a hub 56 illustrated as having a three piece construction including a disc-like plate 58, a socket member 62 having a socket 60 therein and a sleeve 64. The hub 56 may be formed of a single member instead of the three piece construction which is illustrated. The upper surface 53 of the disc 52 has blades 66 and 68 protruding therefrom. The leading edges 69 of these blades with the disc 52 rotating in the direction shown by the arrow 70 chops ice which comes into contact therewith. Two blades 66 and 68 are illustrated since this is the preferred form. However, one or more blades can be used with two appearing to be the most efficient. The blades are also spaced radially outward on either side of the hub 56 with the outer blade 68 being the furthest from the hub and closest to the perimeter skirt 54 on the periphery of the disc 52. As will best be seen in FIG. 3, the hub 56 and the cylindrical skirt 48 form a channel 72 above the blades 66 and 68 which funnels the ice fed through the feed tube 35 onto the blades hitting the ice with a powerful impact thereby performing the chopping function.

The hub 56 contains a socket 60 having semi-curcular grooves or keyways 74 therein which extend different distances upwardly into the walls of the socket and are spaced around the walls of the socket. As will be seen in FIG. 4, the socket 60 has a hexagonal configuration with the grooves 74 being spaced and centered on the six hexagonal surfaces of the socket member 62. As will be explained, the socket 60 is adapted to receive a male head 76 of a shank 78.

Figure 7:
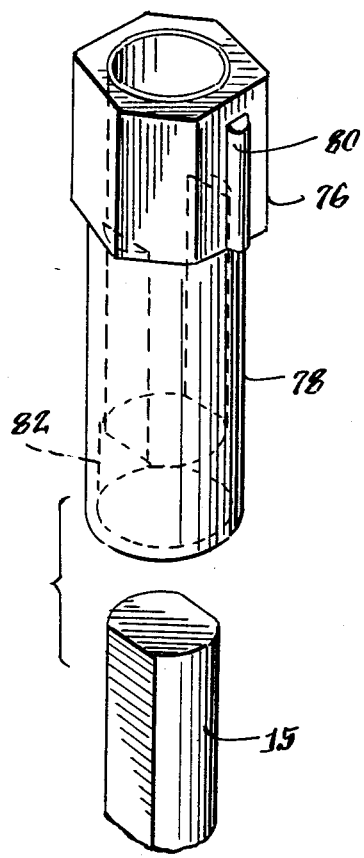
FIG. 7 is an exploded perspective view of the shank of the ice chopper tool and the motor drive means to which it is attached.

As will best be seen in FIG. 7, the shank head 76 has the same external configuration as the socket 60 being illustrated in hexagonal form with one face thereof carrying a key 80 thereon. The other end 82 of the shank 78 is adapted to be positioned on the vertical drive shaft 15 of the motor 14. In other words, the shank 78 may be removably mounted on the shaft 15 on end 82 and the other end, namely the head 76 is adapted to be removably mounted in the socket 60 of the hub 56.

The geometric configurations of the socket 60 and the male shank head 76 must be geometrically complementary so that the male head 76 will fit into the socket 60. Spaced around the interior of the socket 60 are the semi-circular keyways or grooves which receive the key 80 of the male head 76. The depth of the semi-circular grooves or keyways are varied so that when the shank head 76 is inserted into the socket 60, it will penetrate to different depths thereby mounting the disc 52 carrying the hub 56 at varying heights on the shank head 76. This in effect provides a way of elevating or lowering the disc 52 on the shank 78. The ability to vary the positioning of the disc 52 with respect to the cylindrical skirt 48 of the annular channel 40, thereby varies the escape gap 50 and provides the means of adjusting the size of the fragments which are chopped by the apparatus.

Returning again to FIG. 3, it will be noted that the escape gap 50 is established between the lower end of the skirt 48 and the periphery of the disc 52 above its skirt 54. The escape gap 50 provides a means for ice chopped in the channel 72 to be discharged or ejected from the channel 72 into the bowl 20. In other words, the escape gap 50 determines the size to which the ice fed from the feed tube 35 into the channel 72 must be fragmented before it can leave the channel 72. As is illustrated in FIG. 4 in the present illustrations six settings are provided which determine how high the disc 52 is mounted on the shank 78. By rotating the shank head 76 so that the key 80 is aligned with one of the settings 1 through 6 and inserting it into the socket 60 provides the separation between the disc 52 and the lower end of the skirt 48 designated as the escape gap 50. As will be seen in FIG. 3, a "1" setting of the gap is illustrated which is extremely fine for producing ice fragments of almost snow flake particle size. On the other hand, by placing the key 80 in the keyway groove 74 under setting 6 as shown in FIG. 4, a "6" setting as illustrated in FIG. 5 is produced. Similarly, by removing the shank head 76 and rotating the key 80 to a number 5 setting as shown in FIG. 4 produces the "5" setting as illustrated in FIG. 6. The varying of the escape gap 50 produces different separations between the upper surface 53 of the disc 52 and the lower edge of the cylindrical skirt 48 which permits ice fragments to leave the channel 72 in accordance with that setting. The greater the separation, the larger the escape gap 50 which produces larger ice fragments by the apparatus.

Reviewing the operation, if a food processor is utilized, the cover 28 is first removed and any rotary tools which are positioned on the shaft 15 are removed. The shank 78 is then inserted into the hub 56 with the key 80 being inserted in the socket 60 in the setting that is desired. Suppose, for example, it is desired to make ice for a shrimp cocktail, then a setting of 3 or 4 would be suitable and the keyway 80 would be placed in the socket with the key aligning with setting number 3 as shown in FIG. 4. The ice chopping tool is then mounted on the motor shaft 15 and the annular channel member 40 is mounted on top of the bowl 20. The cover 28 is positioned such that the lower extending cam 34 actuates the push rod 22 to turn on the switch 17 to operate the motor 14. Ice chunks, pieces or cubes which are desired to be reduced in size are fed through the feed tube 35 which are directed by the slope guide 46 into the channel 72 between the hub 56 and the cylindrical skirt 48 where the ice comes in contact with the leading edge 69 of the chopping blades 66 and 68. The impact with the leading edge of the chopping blade fragments the ice chunks, and the process is continued until the ice fragments are reduced to a size capable of passing through the escape gap 50, thus being ejected and discharged through the escape gap into the bowl 20. Larger or smaller fragments may be provided simply by changing the positioning of the shank head 76 in the socket 60.

Figure 10:
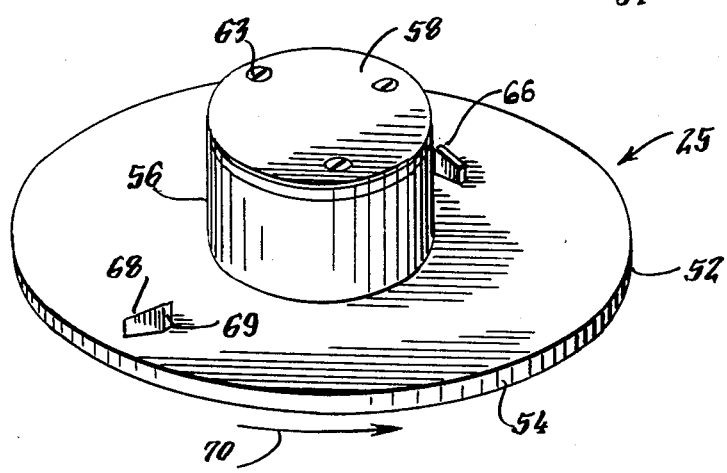
FIG. 10 is another perspective view of a modification of the ice chopping tool of FIG. 9 illustrating the outer blade being angled with respect to the periphery of the tool.

As is illustrated in FIG. 10, the outer chopping blade 68 may be turned at an angle with respect to the annular skirt 54 of the disc 52 which tends to deflect the ice fragments outward toward the escape gap 50.

In accordance with the present invention an annular channel 72 is established between the hub 56 and the cylindrical skirt 48 with an escape gap on the periphery thereof of predetermined size which permits ice which is reduced to that size to be discharged from the channel. This is a simple effective apparatus for reducing the size of ice chunks to any predetermined size desired.

The structure for carrying out the production of ice particles of controlled size is simple and relatively easily adaptable to conventional food processors or to a less multiple function appliance such as a blender where controlled size of the ice fragments is a desirable feature. However, the biggest advantage of the present invention is its use with conventional food processors which in effect expands their utility. The addition of the chopper tool, the annular channel member and a multiple purpose cover which provides cam action for conventional as well as the ice chopping function are useful additions in the food processor field.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. Ice chopping apparatus for processing ice chunks to produce ice fragments of controlled size in an electrical appliance having a motor drive comprising:
   a working bowl having a cover with a feedtube removably mounted thereon,
   a rotary drive which extends up into said bowl and is driven by the motor drive of said appliance,
   a rotary ice chopper tool having a disc-like upper surface with at least one ice-chopping blade protruding upwardly therefrom, said tool mountable in said bowl to be driven by said rotary drive,
   an annular channel member having an annular shelf and a down turned annular skirt for positioning said annular channel member on the top of said bowl between said cover and said bowl, said annular shelf resting on top of said bowl and said down turned skirt resting annularly on said bowl when said annular channel member is mounted on said bowl,
   a downwardly extending cylindrical skirt on said annular channel member which extends down into said bowl to a level above the periphery of said disc-like upper surface for directing ice fed down through said feedtube on said cover into the channel formed by said cylindrical skirt to said disc-like upper surface,
   said disc-like upper surface and said cylindrical skirt forming a uniform annular escape gap of predetermined size extending around above the periphery of said disc-like upper surface of said ice-chopping tool, thereby permitting ice fragments which have been reduced at least to the predetermined size of said uniform escape gap to pass through said gap to be deposited into said bowl, and
   said rotary ice chopper tool has a removable disc-shaped head with a socket on the underside thereof and a removable shank having a first end adapted to be coupled to the rotary drive and having a second end adapted to be positioned in said socket, and means in said socket for varying the depth of penetration of said second end of said shank into said socket for thereby varying the level of said disc-like upper surface of said rotary ice chopper tool relative to said cylindrical skirt for adjusting the size of the annular escape gap of said apparatus for adjusting the size of the ice fragments to be deposited into the bowl.

2. The ice chopping apparatus set forth in claim 1 wherein:
   said second end of said removable shank has a predetermined goemetrical configuration with key means on one face of said geometrical configuration, said socket has the same geometrical configuration as said second end of said shank for receiving said second end therein, said socket has a plurality of key-engaging means therein of different depth, and each said key-engaging means is adapted to engage the key means at different axial positions for thereby varying the elevation of said head on said shank for providing an adjustment of the size of said annular escape gap.

3. The ice chopping apparatus set forth in claim 1 wherein:
   said bowl carries motor-drive actuator means, said actuator means is adapted to be actuated by the appropriate placement of the bowl and said cover on said appliance, said annular channel member has a peripheral rim extending up above the top of said bowl between said bowl and said cover, said cover has an auxiliary cam surface which is adapted to engage said actuator means when said annular channel member is positioned on the top of said bowl, and said cover also includes a standard cam surface which is adapted to engage said actuator means when said cover is appropriately placed on the bowl when said annular channel member has been removed from said bowl.

4. The ice chopping apparatus as claimed in claim 1 wherein said ice chopper tool has two radially spaced blades with one blade on opposite side of said hub.

5. The ice chopping apparatus as claimed in claim 4 wherein one blade of said two radially spaced blades is closer to the periphery of said disc-like upper surface than the other, said one blade being offset at an angle thereby tending to deflect ice fragments outwardly into said annular escape gap.

* * * * *